United States Patent Office 3,073,696
Patented Jan. 15, 1963

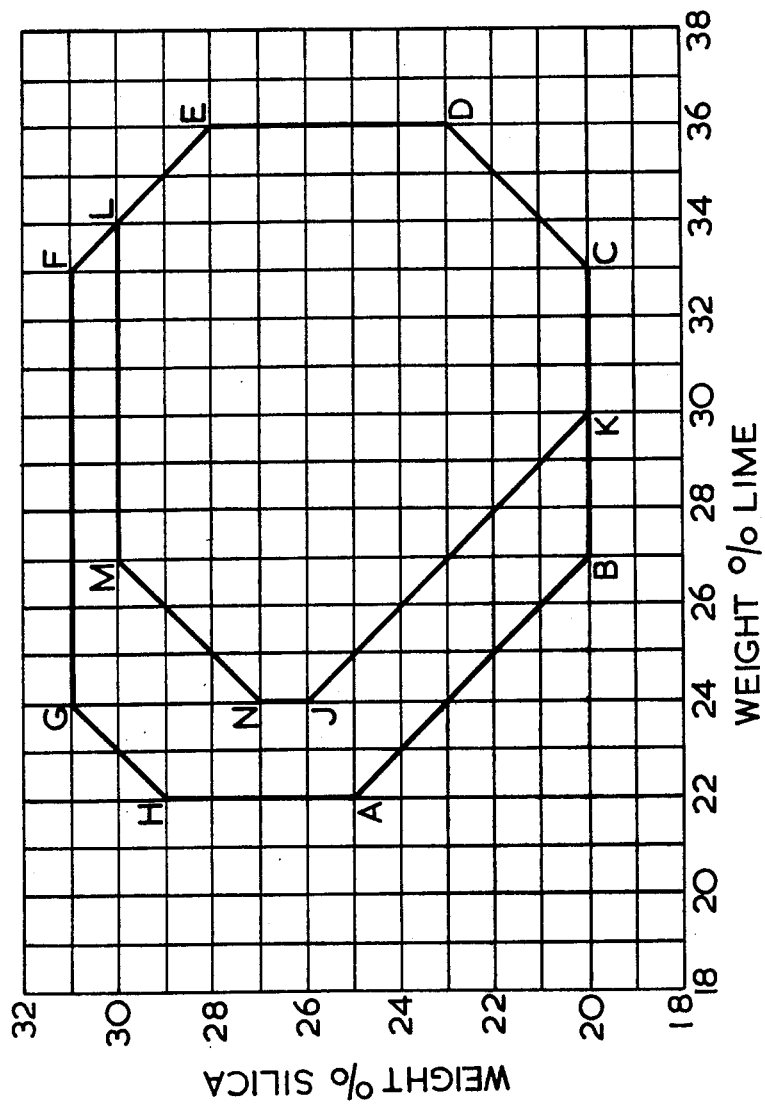

3,073,696
BLAST FURNACE SMELTING OF ZINCIFEROUS MATERIALS
John Lumsden and Patrick Alexander Tempest Keeping, Avonmouth, England, assignors to Metallurgical Processes Limited, Nassau, Bahamas, a corporation of the Bahamas and The National Smelting Company Limited, London, England, a British company
Filed Nov. 25, 1958, Ser. No. 776,313
Claims priority, application Great Britain Dec. 17, 1957
4 Claims. (Cl. 75—87)

This invention relates to the blast furnace smelting of zinciferous materials and has for its object the provision of certain improvements in the smelting of oxidic zinciferous materials with coke in a blast furnace.

In the smelting of oxidic zinciferous materials in a blast furnace, the zinciferous material, if not already in lump form, is sintered to agglomerate it before it is charged to the furnace together with coke and, when necessary, slag-forming additions such as lime. During smelting, air is introduced into the furnace, molten slag is run off from the bottom of the furnace, and zinc compounds are reduced to yield zinc vapour, which is recovered from its admixture with the furnace gases as metallic zinc, zinc oxide, zinc dust and the like. When the zinciferous material contains a recoverable amount of lead, the zinc-smelting furnace can be adapted to smelt the mixed zinc-lead material to yield, in addition to the zinc volatilised, molten metallic lead, which is tapped from the bottom of the furnace along with the molten slag.

The oxidic zinciferous material charged to the blast furnace may arise from a number of sources. The main primary source of zinc is the mineral sphalerite (zinc sulphide—ZnS) which occurs in admixture with other minerals from which it is more or less completely separated by froth flotation or other suitable means of concentration. The zinc concentrate thus separated usually contains iron (in the form of one of its sulphides) as the main other component. One of the minerals with which sphalerite is associated is galena (lead sulphide—PbS) and some of this lead sulphide is usually still present in the zinc-sulphide concentrate. This zinc concentrate is obtained in the form of a fine powder. Before being charged to the blast furnace this sulphide material must be converted to the oxide and this oxide must be obtained in an agglomerated form. One method of effecting this conversion is to sinter-roast so as to oxidise the sulphur to sulphur dioxide, which can be utilised for making sulphuric acid.

Other primary sources of zinc are oxidic minerals, such as calamine (zinc carbonate—$ZnCO_3$) and willemite (zinc orthosilicate—$Zn_2SiO_4$). A low-grade zinc ore is franklinite, consisting of oxides of zinc, iron and manganese; it occurs in association with willemite.

One object of the present invention is to improve the efficiency of zinc recovery in the treatment of oxidic zinciferous materials in a blast furnace, by controlling the composition of the slag tapped from the furnace. As in the smelting of other non-ferrous metals, the main components of the slags that are customarily tapped from zinc-smelting blast furnaces are iron oxide, lime and silica. In all ferruginous slags arising in non-ferrous metallurgy there is some ferric oxide, but most of the iron is present as ferrous oxide (FeO) and throughout this specification, as is customary in the art, the content of iron oxides in the slag is calculated as FeO. One slag composition that has hitherto been found suitable is characterised by the respective ratios of iron oxide (FeO), lime and silica of 1.0:1.5:1.5.

The present invention consists of a method of obtaining a relatively low zinc content in the slag tapped from a zinc-smelting blast furnace with a relatively low consumption of coke by including a relatively large amount of alumina in the furnace charge, while keeping the amounts of lime and silica within limits. The composition of the slag tapped from the furnace is thus controlled with respect to its contents of alumina, lime and silica.

In the blast furnace smelting of zinc according to the invention, the iron present (except for small amounts that may sometimes form a matte or speiss) appears as iron oxide in the slag. Metals that are more reducible from their oxides than iron (such metals, for instance, as copper, lead and tin) are reduced in the blast furnace and do not appear in the slag in important quantities. Metals that are less reducible from their oxides than iron (such metals, for instance, as manganese and magnesium) appear in the slag as oxides. The slag-forming components are iron oxide, lime, silica, alumina, manganese oxide, and magnesium oxide and other metal oxides that are not reduced under the conditions of the zinc-smelting blast furnace. The invention involves controlling the weights of the relative amounts of the main slag-forming oxides introduced into the charge and, in particular, the contents referred to the total weight of slag-forming oxides of alumina, lime, iron oxide and silica. With a given amount of zinc oxide in the slag tapped from the furnace, the invention therefore involves controlling the composition of this slag with respect to its contents of alumina, lime, iron oxide and silica. To avoid thus presupposing the result achieved in specifying how the invention is to be carried out, the invention can be unambiguously defined in terms of the contents of the four components—alumina, lime, iron oxide and silica—in relation to the total weight of slag-forming oxides in the materials charged to the furnace; this is equivalent to specifying the contents of these four components in relation to the weight of zinc-free slag, that is in relation to the difference between the total weight of the slag and the weight of its contained oxide.

A characteristic of the slags produced according to the invention is that the primary solid phase that is formed when the molten slag is cooled contains alumina. As judged by examination by X-ray diffraction, this phase has the characteristic of gehlenite ($2CaO, Al_2O_3, SiO_2=Ca_2AlSiO_7$) but it is likely that the $Al_2O_3$ is partly replaced by $FeSiO_3$ and that the phase consists of a solid solution of gehlenite ($Ca_2AlSiO_7$) and a melilite ($Ca_2FeSi_2O_7$).

By weight, the composition of gehlinite is 40.9% CaO, 37.2% $Al_2O_3$, and 21.9% $SiO_2$, and the weight composition of $Ca_2FeSi_2O_7$ is 36.9% CaO, 23.6% FeO and 39.5% $SiO_2$. A mixture of equal weights of the two compounds would contain 38.9% CaO, 18.6% $Al_2O_3$, 11.8% FeO and 30.7% $SiO_2$; this may be taken as a typical composition of the gehlenite-melilite solid solution that separates, and the composition of the slag must be such that a large proportion of it can separate to give such a solid solution. We believe that the solid that separates contains somewhat less iron oxide than the liquid slag from which it separates, so that an ideal composition would be one in which the FeO content is somewhat higher than 11.8%, say at 16.0%. With the other components present in the same ratio this would make an ideal slag composition; 37.0% CaO, 17.7% $Al_2O_3$, 16.0% FeO and 29.2% $SiO_2$.

A characteristic of such a melilite-gehlenite slag is a comparatively high melting point.

The invention may be better understood by referring to the accompanying drawing in which the range of the contents of lime and silica, referred to the total amounts of slag-forming oxides, is represented graphically. The graph is explained in some detail below.

In the smelting of zinc in a blast furnace, it is desirable to eliminate the zinc as completely as possible from the slag without reducing the iron oxide to give a high melting metallic iron and without unduly increasing the ratio of coke used to zinc produced. We have found that this object is best attained if the slag has a high melting point; more specifically, the criterion is that the temperature at which most, but not all, of the slag becomes molten, should be high. The temperature of complete melting is determined by the formation, on cooling the slag below that temperature, of a solid phase of composition different from that of the liquid slag.

The slags hitherto produced in blast furnace processes for zinc smelting, in common with those produced in most other non-ferrous metallurgical processes, have contained but little alumina, the three main components being lime, silica and iron oxide. From such slags the temperature of complete melting is determined by the formation on cooling of either wustite (non-stoichiometric FeO) or a silicate, which is usually a calcium-iron olivine (a solid solution of $Ca_2SiO_4$ and $Fe_2SiO_4$). According to our findings, many of the ranges of slag composition that are used in non-ferrous metallurgical processes, such as lead smelting, are unsuitable for zinc smelting in blast furnaces because the temperature of complete melting is too low: in such slags, the formation of olivine determines the temperature of complete melting.

The previously mentioned slag composition recommended in the prior art (the weight ratios $FeO:CaO:SiO_2$ respectively 1.0:1.5:1.5) gives a relatively high temperature of complete melting; the solid phase determining the melting temperature may be either calcium metasilicate or a lime-rich olivine.

Zinc concentrates are usually associated with a ferruginous gangue, and are often associated with silica. To obtain the above mentioned ideal slag composition it would nearly always be necessary to add lime and alumina and sometimes necessary to add silica. In determining the permissible ranges of slag composition, it is not therefore necessary to consider raising the lime content above 37.0% or the alumina content above 17.7%, nor is it necessary to consider reducing the FeO content below 16.0%.

There must be present sufficient of the components of gehlenite (lime, alumina, and silica) to ensure that a considerable fraction of the slag can separate as a high-melting melilite. Lower limits must therefore be set to the contents of lime, alumina and silica. Since alumina is the characteristic component that causes melilite rather than a silicate ($CaSiO_3$ or olivine) to be the first phase to separate, primary importance is attached to the lower limit of alumina content. The primary factor determining zinc elimination is the melting point of the slag, but it is also important that the zinc oxide should not be too firmly combined in the slag (that is, that the thermodynamic activity coefficient of zinc oxide in the slag should not be too low). The presence of too much silica makes zinc oxide more difficult to reduce from the slag; therefore, an upper limit must be set to the silica content. The presence of a large amount of lime makes zinc oxide easier to reduce from the slag and thus neutralises the effect of silica, therefore, silica contents that permit satisfactory zinc elimination when the lime content is high cease to do so at low lime contents, and an upper limit must be set to the silica content relatively to the lime content. On the other hand, too high a lime content in relation to the silica content causes the melting point of the slag to become unduly high, so that an upper limit has to be set to the lime content relatively to the silica content.

If too much iron oxide is present, a lower-melting melilite is produced. An upper limit, therefore, has to be set to the iron-oxide content of the slag; this implies a lower limit to the combined contents of lime and silica. Similarly, the lower limit to the iron-oxide implies an upper limit to the combined contents of lime and silica.

According to the prior art, the carbon consumption was the sum of 90% of the weight of zinc to be volatilized and 20% of the slag to be formed. With the weight of slag formed equal to the weight of zinc to be volatilized, this means a carbon consumption of 110% of the weight of zinc to be volatilized. With the slag compositions according to the present invention, we have found that good zinc elimination can be obtained with a lower carbon consumption than was possible according to the prior art.

The following tables show the results obtained in a zinc-smelting blast furnace, in which the weight of slag produced was substantially equal to the weight of zinc volatilized and the amount of coke (wet, as purchased) was about 1.1 times the weight of zinc volatilized. The coke contained 82% carbon, so that the carbon consumption was 90% of the weight of zinc volatilized. The results are arranged in order of increasing alumina content. From the actual slag analyses, the analyses for the zinc-free slag are calculated on the basis of the weight of the zinc-free slag being less than that of the actual slag by the weight of contained zinc oxide (1.245 times the weight of contained zinc).

| Actual Slag, Percent | | | | | Zinc-free Slag, Percent | | | |
| --- | --- | --- | --- | --- | --- | --- | --- | --- |
| $Al_2O_3$ | CaO | $SiO_2$ | FeO | Zn | $Al_2O_3$ | CaO | $SiO_2$ | FeO |
| 5.7 | 29.7 | 19.5 | 22.0 | 12.2 | 6.7 | 35.0 | 23.0 | 26.0 |
| 5.9 | 28.2 | 20.0 | 22.1 | 12.9 | 7.0 | 33.6 | 23.8 | 26.3 |
| 6.2 | 31.4 | 20.8 | 20.9 | 9.9 | 7.1 | 35.8 | 23.7 | 23.9 |
| 6.4 | 23.2 | 21.5 | 28.2 | 10.1 | 7.3 | 26.5 | 24.6 | 32.3 |
| 6.7 | 29.4 | 20.9 | 21.5 | 9.5 | 7.5 | 33.3 | 23.7 | 24.4 |
| 6.9 | 27.4 | 26.4 | 21.4 | 8.0 | 7.6 | 30.4 | 29.3 | 23.8 |
| 6.6 | 29.1 | 20.1 | 20.4 | 12.2 | 7.8 | 34.3 | 23.7 | 24.1 |
| 6.9 | 29.5 | 20.4 | 20.4 | 11.2 | 8.0 | 34.3 | 23.7 | 23.7 |
| 7.0 | 30.5 | 20.3 | 20.1 | 10.8 | 8.1 | 35.2 | 23.4 | 23.2 |
| 7.3 | 28.8 | 19.3 | 24.0 | 9.4 | 8.3 | 32.6 | 21.9 | 27.2 |
| 7.2 | 21.5 | 19.8 | 27.2 | 11.4 | 8.4 | 25.1 | 23.1 | 31.9 |
| 7.3 | 27.0 | 17.7 | 24.0 | 11.5 | 8.5 | 31.5 | 20.6 | 28.0 |
| 7.4 | 25.4 | 19.2 | 23.1 | 11.8 | 8.7 | 29.8 | 22.5 | 27.1 |
| 7.8 | 23.6 | 20.2 | 27.7 | 10.7 | 8.9 | 27.2 | 23.3 | 31.9 |
| 7.9 | 24.0 | 20.7 | 26.8 | 9.4 | 8.9 | 27.2 | 23.4 | 30.4 |
| 8.4 | 31.8 | 23.4 | 22.6 | 5.4 | 9.0 | 34.1 | 25.1 | 24.2 |
| 8.7 | 30.3 | 24.4 | 21.8 | 4.4 | 9.2 | 32.1 | 25.8 | 23.1 |
| 8.1 | 24.4 | 28.3 | 20.7 | 10.5 | 9.3 | 28.1 | 32.6 | 23.8 |
| 8.2 | 24.4 | 20.9 | 27.5 | 9.4 | 9.3 | 27.6 | 23.7 | 31.2 |
| 8.4 | 22.6 | 22.2 | 26.8 | 8.9 | 9.4 | 25.4 | 25.0 | 30.1 |
| 8.9 | 29.3 | 22.2 | 23.1 | 5.3 | 9.5 | 31.4 | 23.8 | 24.8 |
| 8.7 | 22.8 | 23.1 | 27.5 | 7.8 | 9.6 | 25.6 | 26.0 | 30.9 |
| 8.9 | 23.3 | 25.5 | 28.5 | 5.9 | 9.6 | 25.2 | 27.5 | 30.8 |

| Actual Slag, Percent | | | | | Zinc-free Slag, Percent | | | |
| --- | --- | --- | --- | --- | --- | --- | --- | --- |
| $Al_2O_3$ | CaO | $SiO_2$ | FeO | Zn | $Al_2O_3$ | CaO | $SiO_2$ | FeO |
| 9.1 | 25.9 | 23.6 | 26.7 | 5.0 | 9.7 | 27.6 | 25.2 | 28.5 |
| 9.5 | 31.6 | 24.3 | 21.5 | 1.5 | 9.7 | 32.2 | 24.8 | 21.9 |
| 9.1 | 24.1 | 24.8 | 27.3 | 5.5 | 9.8 | 25.9 | 26.6 | 29.3 |
| 9.2 | 22.4 | 24.9 | 29.0 | 4.9 | 9.8 | 23.9 | 26.6 | 30.9 |
| 9.3 | 24.2 | 25.5 | 26.1 | 4.0 | 9.8 | 25.5 | 26.9 | 27.5 |
| 9.2 | 23.0 | 27.4 | 23.9 | 7.5 | 10.2 | 25.1 | 29.9 | 26.1 |
| 9.6 | 27.5 | 21.9 | 30.7 | 4.5 | 10.2 | 29.1 | 23.2 | 32.5 |
| 10.1 | 24.4 | 26.9 | 26.7 | 3.1 | 10.5 | 25.4 | 28.0 | 27.3 |
| 10.0 | 24.8 | 23.9 | 29.9 | 4.8 | 10.6 | 26.4 | 25.5 | 31.8 |
| 10.0 | 24.8 | 25.9 | 22.9 | 5.1 | 10.7 | 26.5 | 27.8 | 24.5 |
| 10.3 | 31.5 | 23.1 | 21.1 | 3.4 | 10.8 | 32.9 | 24.1 | 22.0 |
| 10.6 | 30.1 | 26.1 | 21.1 | 2.5 | 10.9 | 31.1 | 26.9 | 21.8 |
| 10.6 | 32.5 | 24.6 | 19.8 | 3.9 | 11.1 | 34.2 | 25.9 | 20.8 |
| 11.0 | 32.7 | 25.3 | 18.3 | 1.6 | 11.2 | 33.4 | 25.8 | 18.7 |
| 10.8 | 33.4 | 21.8 | 20.4 | 3.9 | 11.3 | 35.1 | 22.9 | 21.5 |
| 10.9 | 26.9 | 25.5 | 25.3 | 3.0 | 11.4 | 27.9 | 26.5 | 26.3 |
| 10.7 | 22.2 | 27.4 | 26.1 | 5.3 | 11.5 | 23.8 | 29.3 | 28.0 |
| 10.9 | 24.0 | 26.7 | 24.2 | 4.3 | 11.5 | 25.4 | 28.2 | 25.6 |
| 10.8 | 21.1 | 27.1 | 26.6 | 5.7 | 11.6 | 22.7 | 29.2 | 28.6 |
| 11.1 | 25.9 | 21.6 | 29.4 | 3.7 | 11.6 | 27.2 | 22.6 | 30.8 |
| 11.0 | 26.5 | 24.8 | 25.3 | 4.4 | 11.6 | 28.0 | 26.2 | 26.8 |
| 10.9 | 21.9 | 23.6 | 30.2 | 5.5 | 11.7 | 23.5 | 25.3 | 32.4 |
| 11.2 | 23.3 | 25.5 | 27.8 | 3.3 | 11.7 | 24.3 | 26.6 | 29.0 |
| 11.2 | 23.1 | 27.6 | 25.8 | 4.7 | 11.9 | 24.5 | 29.3 | 27.4 |
| 11.8 | 23.1 | 26.7 | 25.8 | 4.3 | 12.5 | 24.4 | 28.2 | 27.3 |
| 11.4 | 21.1 | 25.8 | 29.3 | 6.9 | 12.5 | 23.1 | 28.2 | 32.1 |
| 11.8 | 23.2 | 27.8 | 24.6 | 6.0 | 12.8 | 25.1 | 30.1 | 26.6 |
| 12.6 | 27.2 | 24.7 | 23.9 | 2.9 | 13.1 | 28.2 | 25.6 | 24.8 |
| 12.4 | 25.8 | 24.4 | 25.5 | 4.7 | 13.2 | 27.4 | 25.9 | 27.1 |
| 12.6 | 26.3 | 23.6 | 27.8 | 3.4 | 13.2 | 27.5 | 24.6 | 29.0 |
| 12.5 | 25.1 | 28.3 | 24.7 | 4.8 | 13.3 | 26.7 | 30.1 | 26.3 |
| 12.9 | 25.7 | 24.7 | 25.2 | 4.7 | 13.7 | 27.3 | 26.2 | 26.8 |
| 13.6 | 28.8 | 21.4 | 23.8 | 4.7 | 14.4 | 30.6 | 24.4 | 25.3 |

The invention further consists of a method of blast-furnace smelting of zinciferous materials in which, in the slag produced, calculated on the basis of the weight of zinc-free slag, the alumina content is not less than 9.7% and not greater than 17.7%, the lime content is not less than 22.0% and not greater than 36.0%, the silica content is not less than 20.0% and not greater than 31.0%, the sum of the lime and silica contents is not less than 47.0% and not greater than 64.0%, the weight percent silica does not exceed the weight percent lime by more than 7.0%, the weight percent lime does not exceed the weight percent silica by more than 13.0% and the iron-oxide (FeO) content is not less than 16.0% and not greater than 34.0%.

For example, in a typical slag containing 4.0% zinc (5.0% zinc oxide) these conditions mean that, in the actual slag, the alumina content is not less than 9.2% and not greater than 16.8%, the lime content is not less than 21.0% and not greater than 34.2%, the silica content is not less than 19.0% and not greater than 29.4%, the sum of the lime and silica contents is not less than 44.6% and not greater than 60.8%, the weight percent silica does not exceed the weight percent lime by more than 6.6%, the weight percent lime does not exceed the weight percent silica by more than 12.4% and the iron-oxide (FeO) content is not less than 15.2% and not greater than 32.3%.

The range of the contents of lime and silica, referred to the total amounts of slag-forming oxides, can conveniently be represented graphically as in the accompanying drawing. The eight boundary lines of the polygonal area ABCDEFGHA shown, correspond to the following eight inequalities.

AB: (percent CaO+percent SiO$_2$) is not less than 47
BC: percent SiO$_2$ is not less than 20
CD: (percent CaO—percent SiO$_2$) is not greater than 13
DE: percent CaO is not greater than 36
EF: (percent CaO+percent SiO$_2$) is not greater than 64
FG: percent SiO$_2$ is not greater than 31
GH: (percent SiO$_2$—percent CaO) is not greater than 7
HA: percent CaO is not less than 22

In addition, there are the following further restrictions:

Percent FeO is not less than 16
Percent FeO is not greater than 34
Percent Al$_2$O$_3$ is not less than 9.7
Percent Al$_2$O$_3$ is not greater than 17.7

Within these limits, especially good zinc elimination is attained by incorporating the following further restrictions, in which the restrictions shown on the graph are as follows:

JK: (percent CaO+percent SiO$_2$) is not less than 50
KC: percent SiO$_2$ is not less than 20
CD: (percent CaO—SiO$_2$) is not greater than 13
DE: percent CaO is not greater than 36
EL: (percent CaO+percent SiO$_2$) is not greater than 64
LM: percent SiO$_2$ is not greater than 30
MN: (percent SiO$_2$—percent CaO) is not greater than 3
NJ: percent CaO is not less than 24

In addition, there are the following further restrictions:

Percent FeO is not less than 16
Percent FeO is not greater than 34
Percent Al$_2$O$_3$ is not less than 9.7
Percent Al$_2$O$_3$ is not greater than 17.7

The alumina can be incorporated in the furnace charge in any convenient form. It can, for instance, be added as bauxite; while a high-grade bauxite may be used, a low-grade bauxite is suitable; in general, a ferruginous rather than a siliceous bauxite is preferred, particularly if much silica is present in the other charge materials. If the silica otherwise present is low, the alumina may be added as aluminum silicate, or as a material containing both alumina and silica in considerable amounts, but in general the beneficial effect of the alumina is undesirably reduced if, in the material in which it is added, it is accompanied by more than twice its weight of silica.

We claim:

1. In the process of smelting oxidic zinciferous materials with coke in a blast furnace, running off a slag and recovering zinc from the furnace gases, the improvement in combination therewith which comprises charging to the furnace slag-forming iron oxide, lime, silica, alumina, manganese oxide, and magnesium oxide, conducting the zinc smelting operation under conditions such that said components of the charge are not reduced, the weights of the relative amounts of the main slag-forming oxides of alumina, lime, iron oxide and silica introduced into the charge to produce a slag, calculated on the basis of zinc-free slag, being such that the alumina content is between about 9.7% and 17.7%, the lime content is between about 22.0% and 36.0%, the silica content is between about 20.0% and 31.0%, the lime and silica contents being further restricted in relation to each other in accord with polygon ABCDEFGHA of the accompanying drawing, and the iron oxide (FeO) content is between about 16.0% and 34.0%.

2. Process according to claim 1, in which the slag-forming components charged contain amounts of lime and silica with restrictions in accord with polygon JKCDELMNJ of the accompanying drawing.

3. Process according to claim 1, in which part of the alumina included in the materials charged to the furnace is derived from specially added bauxite.

4. Process according to claim 1, in which the amount of iron oxide content (FeO) is between about 16% and 30%.

References Cited in the file of this patent
UNITED STATES PATENTS

| | | |
|---|---|---|
| 975,217 | Desgaraz | Nov. 8, 1910 |
| 2,506,558 | Goller | May 2, 1950 |
| 2,598,743 | Waring et al. | June 3, 1952 |
| 2,795,500 | McIntosh | June 11, 1957 |
| 2,932,566 | Lumsden | Apr. 12, 1960 |

OTHER REFERENCES

Merriman: A Dictionary of Metallurgy, pub. McDonald & Evans Ltd., London, 1958, p. 16 only.

UNITED STATES PATENT OFFICE

CERTIFICATE OF CORRECTION

Patent No. 3,073,696 January 15, 1963

John Lumsden et al.

It is hereby certified that error appears in the above numbered patent requiring correction and that the said Letters Patent should read as corrected below.

Column 5, line 55, for "(percent $CaO-SiO_2$)" read -- (percent CaO-percent $SiO_2$) --; column 6, line 52, for "Desgaraz" read -- Desgraz --.

Signed and sealed this 3rd day of September 1963.

(SEAL)
Attest:

ERNEST W. SWIDER
Attesting Officer

DAVID L. LADD
Commissioner of Patents